J. D. SARTAKOFF.
AUTOMATIC WATER FEED FOR STORAGE BATTERIES.
APPLICATION FILED JULY 1, 1919.
1,349,297.
Patented Aug. 10, 1920.
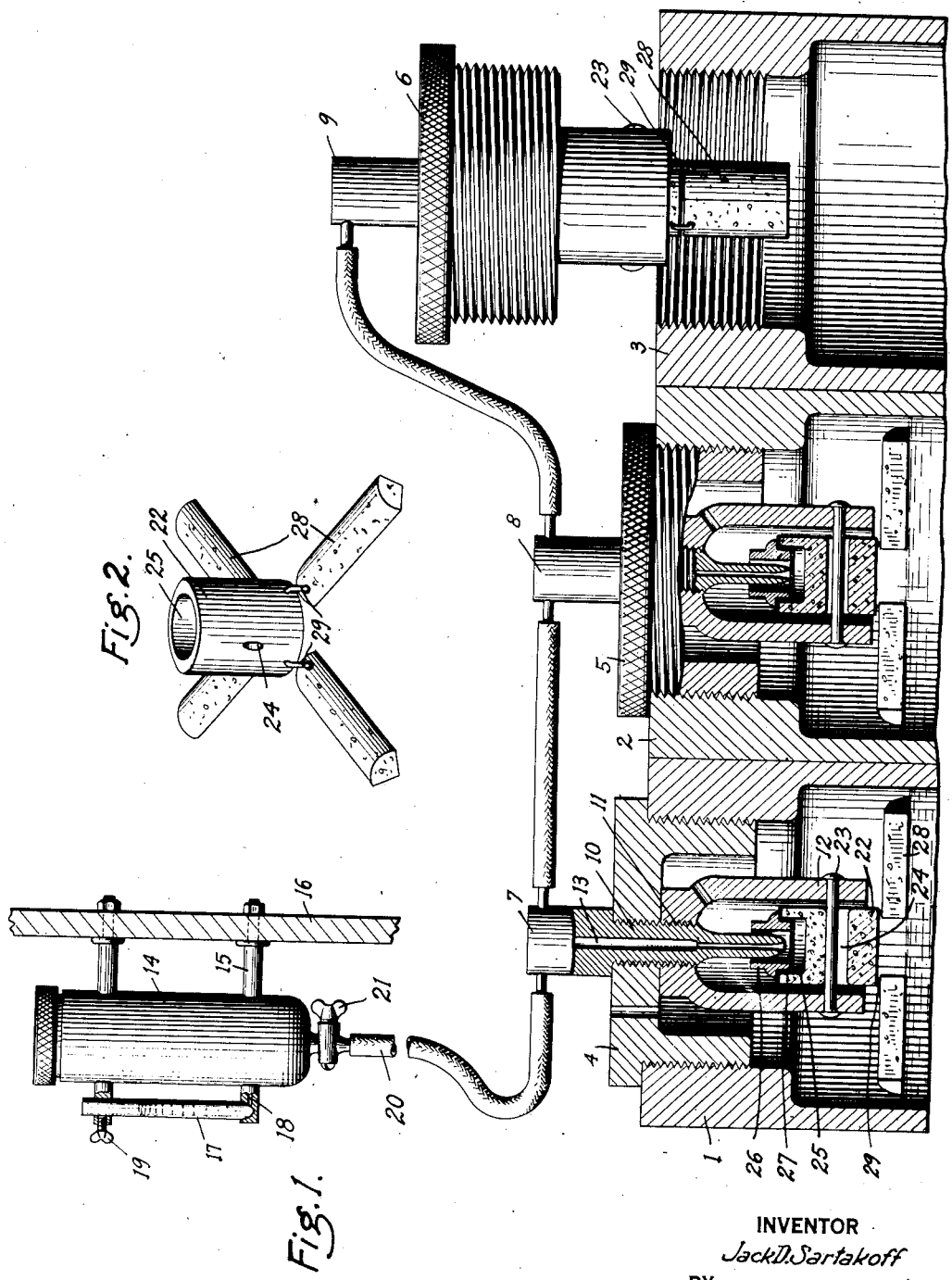
INVENTOR
Jack D. Sartakoff
BY Jas. H. Griffin
ATTORNEY

UNITED STATES PATENT OFFICE.

JACK D. SARTAKOFF, OF NEW YORK, N. Y.

AUTOMATIC WATER-FEED FOR STORAGE BATTERIES.

1,349,297.   Specification of Letters Patent.   Patented Aug. 10, 1920.

Application filed July 1, 1919. Serial No. 308,057.

*To all whom it may concern:*

Be it known that I, JACK D. SARTAKOFF, a citizen of Russia, residing in the city of New York, borough of Manhattan, county and State of New York, have invented a certain new and useful Automatic Water-Feed for Storage Batteries, of which the following is a specification.

This invention is an automatic water feed for storage batteries, the broad object of the invention being to provide an apparatus which will automatically replenish the water supply in a plurality of storage cells individually from time to time from a common external reservoir when the liquid level in the respective cells recedes due to evaporization, leakage, etc.

From a more specific standpoint the object of the invention is to provide a system of this character which is particularly adaptable for use on automobiles without in any way changing the construction of the storage batteries normally associated therewith, and without making their structure bulky, and feeding the water to the battery through a conduit positioned at another portion of the car and preferably in concealed position.

A further object of the invention is to simplify and render more efficient the automatic feed controlling means whereby it will be highly sensitive to changes in water levels in the respective cells of the battery.

Features of the invention, other than those specified, will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1 is a diagrammatic showing of the automatic feed apparatus of this invention associated with a battery of the type usually employed on automobiles, different portions of the system being shown in various positions in the interest of clearness; and, Fig. 2 is a perspective detail of certain float construction preferably employed.

Referring to the drawings 1, 2 and 3 designate the cells of the three cell storage battery of the character normally employed in the ignition system of automobiles. Each of these cells is provided with the usual plates (not shown) which are immersed in a suitable electrolyte which during use evaporates or is otherwise disseminated so as to require this replenishing from time to time with distilled water for the purpose of maintaining the desired specific gravity of the electrolyte. The cells 1, 2 and 3 are provided with the usual screw caps 4, 5 and 6 respectively, through which upon removal of each it has been the practice to replenish the battery as necessity required.

In adapting a system of this invention to a plurality of battery cells of the character described, a central aperture is provided in each of the caps 4, 5 and 6 and water inlet members 7, 8 and 9 are associated with each cap. Each inlet member has a reduced shank 10 which is adapted to extend through the aperture in the cap and be threaded as at 11 to screw into the upper end of a hollow cage or shell 12. The water inlet members are tubular and their lower ends are in the form of an outlet nipple to which the duct 13 extends longitudinally through said members. Through the threaded coöperation between the inlet members and their respective cages 12 the parts are rigidly mounted on the respective screw caps in a simple and efficient manner.

The water is fed to the respective ducts 13 from a common reservoir or supply tank 14 which is provided with threaded brackets 15 adapted to be secured to the dash 16 of an automobile in such position as to underlie the hood or cowl of the car. The reservoir 14 has a screw cover to allow of the filling of said reservoir from time to time and for the sake of convenience is associated therewith a gage glass 17. The interior of the gage glass is in communication with the interior of the reservoir through the channel 18 and the upper end of the gage glass is opened so that said gage will at all times correctly register the level in the reservoir. The gage glass 17 is held in position by a set screw 19 as shown. The screw cover of the reservoir is preferably also provided with an aperture to allow of the unrestricted flow of liquid through the outlet pipe or main 20 which leads to the water inlet members 7, 8 and 9, coupled up in series as shown. A stop cock 21 is preferably associated with the main 20 to allow of the shutting off of the water supply if the batteries are detached for recharging or for other reasons.

It will be apparent that in the construction as thus far described the turning arm of the cock 21 will allow of the unrestricted flow of water from the reservoir 14 into each of the cells through the main 20. As this would merely result in the flooding of the respective cells, means is provided for automatically controlling the feed of water to the cells, individually, said means being dependent for its operation upon a water level in the individual cells. The controlling means in each cell consists of a float 22 which is supported in the corresponding cage 12 for slight vertical movement on a pin 23 which is fixed in the opposite side of the cage and extends through a slot 24 in the float 22. The upper end of the float is recessed at 25 to receive a tubular plug 26, across the lower end of which is stretched a diaphragm 27, the marginal portions of which preferably grip the outer periphery of the plug 26 and the walls of the recess 25. The lower end of the shank 10 projects into the interior of the tubular plug 26 and the proportions of the parts are such that when the float is depressed the diaphragm 27 will be forced against the outlet of the duct 13, as shown in cell 2 of the drawings, and will seal the said duct. However, when the float is lowered the diaphragm will be free from engagement with the lower end of the shank 10 as shown in the cell 1 of Fig. 1 and the duct 13 will be unsealed. The diaphragm 27 is preferably made of rubber or of some other flexible material so that it will adequately seal the duct 13 when brought into engagement with the end of the shank, the action being the same as when the palm of a person's hand is held over the open end of a tube. In both instances the passage of fluid through the tube will be effectually precluded. It will, of course, appear that the use of the pin 23 is not absolutely essential but is preferable since it holds the float at all times against movement out of coöperative relation with the lower end of the shank 10 prior to the initial filling of the cells and at other times when the cap is removed or the liquid level allowed to purposely recede below a predetermined height. The vertical play between the float and the pin is, however, sufficient to allow of the sealing and unsealing of the inlet and this presence of said pin is most desirable under ordinary conditions.

It will, of course, be understood that the size and shape of the float may vary within the wide limits depending upon the particular battery with which it is associated. A relatively large float is preferable whenever possible as this results in the most sensitive action. However, in many instances the opening in the top of the cell is made comparatively small and the introduction of a relatively large float would in such a case be either difficult or impossible. In instances of this character I may employ a collapsible float which during introduction of the float into the cell may be collapsed and thereafter expanded to provide greater displacements than could possibly be availed of if a small rigid float were employed. To this end the lower portion of the float 22 may be provided with hinged float sections 28 pivoted to the float 22 by rubber strips 29 or otherwise so as to allow of free pivotal movement of the float sections 28. With such a construction the float section may be collapsed into the positions shown with reference to the cells 3 to allow of the ready introduction of the float and its sections through the opening in the top of the cell but as soon as the sections engage with the solution in the cell the sections 28 will separate and float upon the surface of the liquid because of their buoyancy, after the manner shown in cells 1 and 2. A relatively large buoyancy surface will thus be obtained which will render the device more sensitive to changes in the liquid level than could possibly be the case if a much smaller rigid float was employed.

One of the other important practical features of this invention resides in the fact that the system may be readily applied to any battery on the market without necessitating the remodeling of the battery. Almost all that would be necessary under the most adverse conditions would be to provide a new cap for each cell, and as these caps are of a more or less uniform size the carrying of a few extra sizes of caps on hand, by the accessories salesman would obviate any trouble in applying the present invention to practically any car in the market. In practice the battery is usually carried in a battery box on the running board and with such a construction the reservoir is usually mounted under the cowl on the dash where it is out of sight. The only unconcealed portion of this system, in practice, is a neat armored tubing extending from beneath the hood of the battery box. The present invention is applicable to all makes of cars and can be incorporated by a few minutes' work without requiring a highly skilled mechanic. The reservoir is replenished from time to time and serves thereafter to automatically feed the cells individually. One of the many marked advantages in this individually feeding the cells is that if impurities find their way into one of said cells they are not transmitted throughout all of the cells of the battery. For the purpose of illustration I have shown but a single battery having three distinct cells formed as shown but the invention may serve also to feed the individual cells of a plurality of batteries by simply adding connections in series as described in connection with the coupling up of the three cells shown.

A marked advantage inherent in the use of a diaphragm to seal the inlets to the respective cells is that there will be no sticking of the parts which would render the control of water feed uncertain. A needle valve might be employed and actuated by the float to seal the inlets, but experience has shown that the needle valve is apt to stick and allow the water to recede the water level a considerable distance before the needle valve frees itself. This cannot possibly occur when a diaphragm is employed.

Having thus fully described the invention, what I claim as new, and desire to secure by Letters Patent is:

1. A device of the character described embodying a battery cell, a feed tube depending into the cell from the top thereof, a float positioned beneath said tube, and a diaphragm carried by the float and adapted to be elevated by the rise of water in the cell for closing the lower open end of the tube.

2. A device of the character described embodying a battery cell having a removable cap, and a feed tube passing through said cap and having an outlet at its lower end, a float positioned beneath the tube, and a diaphragm carried by the float and adapted to be elevated by the rise of liquid level in the cell to close the open end of the tube.

3. A storage battery cell provided with an opening in the top thereof, a cap for closing said opening, a water inlet tube extending through said cap, means positioned within the cell for controlling the discharge of water through the tube into the cell, and a float for operating the controlling means, said float embodying a plurality of collapsible bouyant sections whereby the float may be collapsed for the purpose of introducing it through the opening in the cell, whereupon the introduction of water into the cell causes the sections to float into expanded position for the purpose of rendering the float more sensitive to variations in liquid level in the cell.

4. A storage battery cell provided with an opening at the top thereof, a closure for said opening, a means for feeding water through said opening, and means, positioned within the cell, for controlling the flow of said water, said controlling means embodying a collapsible float adapted to be collapsed for passage through the opening and thereafter expanded to present maximum floating surface to the liquid in the cell.

5. A storage battery cell provided with a water inlet in the form of a conduit terminating in an open end above the surface of the liquid in the cell, a float within the cell, and a diaphragm carried by the float, and adapted to be elevated by the rise of liquid level in the cell to a position to seal the open end of the conduit.

6. A storage battery cell provided with a water inlet in the form of a conduit terminating in an open end above the surface of the liquid in the cell, a float within the cell, and a diaphragm carried by the float, and adapted to be elevated by the rise of liquid level in the cell to a position to seal the open end of the conduit, and means, within the cell, for guiding the operations of the float for the purpose of maintaining the diaphragm in coöperative relation with the open end of the conduit.

In testimony whereof, I sign my name to this specification.

JACK D. SARTAKOFF.